United States Patent [19]

Uchida et al.

[11] Patent Number: 4,504,883

[45] Date of Patent: Mar. 12, 1985

[54] ARRESTER HOLDER APPARATUS FOR DISTRIBUTOR OF COMMUNICATION APPARATUS

[75] Inventors: Susumu Uchida; Kazushige Tadokoro, both of Sagamihara, Japan

[73] Assignee: Kabushiki Kaisha Sankosha, Tokyo, Japan

[21] Appl. No.: 477,382

[22] Filed: Mar. 21, 1983

[30] Foreign Application Priority Data

May 20, 1982 [JP] Japan .............................. 57-72736[U]

[51] Int. Cl.³ ............................................. H02H 1/04

[52] U.S. Cl. ................................... 361/119; 361/331

[58] Field of Search ............... 361/119, 120, 331, 428; 339/147 P; 179/98

[56] References Cited

U.S. PATENT DOCUMENTS

| | | | |
|---|---|---|---|
| 3,961,226 | 6/1976 | Hoffman et al. | 361/120 X |
| 4,314,302 | 2/1982 | Baumbach | 361/119 |
| 4,328,524 | 5/1982 | Nozick | 361/119 |
| 4,420,792 | 12/1983 | Hegner et al. | 361/119 X |

FOREIGN PATENT DOCUMENTS

| | | |
|---|---|---|
| 2508845 | 2/1980 | Fed. Rep. of Germany . |
| 55-13370 | 4/1980 | Japan . |
| 54-91631 | 12/1980 | Japan . |

*Primary Examiner*—Reinhard J. Eisenzopf

*Attorney, Agent, or Firm*—Schwartz, Jeffery, Schwaab, Mack, Blumenthal & Koch

[57] ABSTRACT

An arrester holder apparatus having a cassette type insulating support which is detachably mounted in a distributor of a communication apparatus and has a plurality of openings staggered about the longitudinal axis thereof. A plurality of contact members are molded together with the cassette type insulating support such that one end of each of the contact members constitutes one contact portion which is in contact with a corresponding one of terminals of the distributor and such that the other end of each of the contact members constitutes the other contact portion which is exposed in a corresponding one of the openings at one side thereof. A ground member comprising a metal spring is mounted on the cassette type insulating support such that one end of the ground member has a plurality of contact pieces, each being exposed in the corresponding opening at the other side thereof and such that the other end of the ground member constitutes a common contact portion which is grounded. Each arrester is detachably mounted between the other contact portion of each contact member which is exposed in the corresponding one of the openings at one side thereof and each contact piece of the ground member which is exposed in the corresponding opening at the other side thereof.

8 Claims, 9 Drawing Figures

ARRESTER HOLDER APPARATUS FOR DISTRIBUTOR OF COMMUNICATION APPARATUS

BACKGROUND OF THE INVENTION

The present invention relates to an arrester holder apparatus for detachably mounting a plurality of arresters in a cassette type insulating support. More particularly, the present invention relates to an arrester holder apparatus applied to apparatus for protecting a plurality of circuits against a surge voltage and/or current, wherein the cassette type insulating support is detachably mounted in a distributor of a communication apparatus such as a telephone exchange, and the plurality of arresters are respectively connected to the plurality of circuits to be protected, such as transmission lines connected to the distributor.

A conventional arrester holder apparatus used in a distributor of a communication apparatus such as a telephone exchange comprises a plurality of contact members and a ground member. The plurality of contact members are partially embedded in a cassette type insulating support which is detachably mounted in the distributor. When the insulating support is mounted in the distributor, one contact portion of each of the plurality of contact members is connected to a corresponding terminal of the respective circuits to be protected. The terminals of the circuits to be protected are connected to the distributor. The other contact portion of each of the plurality of contact members is connected to one electrode of each of the plurality of arresters respectively mounted in arrester shells. The arrester shells are formed in the insulating support. The ground member is detachably mounted on the insulating support such that each of the contact pieces of one contact portion of the ground member opposes the other contact of each of the plurality of contact members and such that it is connected to the other electrode of each of the plurality of arresters. Each of the other contact portions of the ground member is commonly grounded. In the arrester holder apparatus of this type, when the number of arresters increases, the construction of the plurality of contact members becomes complicated. In this case, in order to simplify the construction of the plurality of contact members, a method for manufacturing contact members is proposed as described in Japanese Patent Publication No. 55-13370. According to this method, a single plate is punched to make an integral member consisting of contact members, the number of which is equal to that of the arresters, and transverse connecting bands connecting the contact members. This integral member is partially embedded in a cassette type insulating support by integral molding. Thereafter, the connecting portions of the transverse connecting bands are cut by a cutting tool to obtain a plurality of contact members. In the same prior art, a U-shaped common ground member is used to form a groove, and a notch is formed in one leg thereof. This notch is engaged with a projection formed on the cassette type insulating support, thereby detachably mounting the common ground member on the insulating support. At the same time, a plurality of contact pieces corresponding to the number of arresters is formed on the other leg of the common ground member such that the contact pieces are mounted in the arrester shells of the insulating support so as to respectively oppose the contact portions of the plurality of contact members. The respective arresters are detachably mounted in the gaps respectively formed between the contact pieces of the common ground member and the contact portions of the contact members, thereby electrically connecting the contact pieces of the common ground member with the contact portions of the contact members respectively through the arresters.

In an arrester holder apparatus of the type described above, as described in Japanese Patent Publication No. 55-13370, the axial direction (direction in which a pair of electrodes of the arrester oppose each other) of each arrester mounted in the corresponding arrester shell of the cassette type insulating support is perpendicular to the plane of the cassette type insulating support. Therefore, in the conventional apparatus, when the arresters are respectively mounted in the arrester shells or removed therefrom, the common ground member must be removed from the cassette type insulating support. Alternatively, the contact pieces of the common ground member must be forcibly opened, resulting in cumbersome operation. Furthermore, as the mounting/dismounting operation is repeated, the common ground member becomes deformed, and the engagement between the common ground member and the insulating support of the contact members becomes unstable. Consequently, the electrical contact between each contact member and the corresponding arrester becomes poor. In addition to the drawbacks described above, when the arrester holder apparatus is inserted into or removed from the distributor or the like, slidable operation therebetween cannot be smoothly performed. The electrical contact among the contact pieces of the ground member, the contact portions of the contact members, and the terminals (of the circuit to be protected) mounted in the distributor may not be properly performed.

Furthermore, in the type of arrester holder apparatus described above, the arresters mounted in the arrester shells of the cassette type insulating support are linearly aligned along the longitudinal direction of the cassette type insulating support. Therefore, the length of the insulating support must exceed a product obtained by multiplying the length of the arrester and the number of arresters. As a result, a compact arrester holder apparatus with a high density cannot be obtained, and the distributor connected thereto thus cannot be made compact.

SUMMARY OF THE INVENTION

It is an object of the present invention to provide an arrester holder apparatus for easily mounting a plurality of arresters on or detaching them from a cassette type insulating support.

It is another object of the present invention to provide an arrester holder apparatus wherein shapes of a cassette type insulating support for detachably mounting a plurality of arresters and of a plurality of contact members to be mounted therein are simplified, and the plurality of contact members are electrically connected to the corresponding terminals of a distributor to give stability over a long period of time.

It is still another object of the present invention to provide an arrester holder apparatus wherein a plurality of arresters are mounted in a cassette insulating support with a high density, thereby making the cassette type insulating support, and hence, the distributor compact.

In order to achieve the above objects of the present invention, there is provided an arrester holder apparatus, comprising: a cassette type insulating support which has a plurality of openings formed in a plate, said openings being staggered about a longitudinal axis of the plate; a plurality of contact members each of which is partially molded in said cassette type insulating support and has a first contact portion and a second contact portion, said first contact portion being connected to a corresponding terminal of a distributor when said cassette type insulating support is mounted in said distributor, and said second contact portion extending into each of said plurality of openings from one side thereof; a ground member having one contact portion and a common contact portion, said one contact portion being constituted by a plurality of contact pieces each of which is inserted at the other side of each of said plurality of openings, and said common contact portion being mounted on said cassette type insulating support so as to be grounded; and a plurality of arresters each comprising a pair of electrodes which are detachably inserted between said second contact portion of each of said contact members which is exposed inside said one side of each of said plurality of openings and each of said contact pieces of said ground member which is inserted in said other side of each of said plurality of openings.

According to the arrester holder apparatus of the present invention, a difference between lengths of legs of any two adjacent contact members among said plurality of contact members is greater than a length of each of said plurality of arresters, a difference between lengths of legs of any two adjacent contact pieces among said plurality of contact pieces is greater than the length of each of said plurality of arresters, and said second contact portion of each of said contact members which is exposed inside said one side of each of said plurality of openings and said each of said contact pieces of said ground member which is inserted in said other side of each of said plurality of openings oppose each other along a direction perpendicular to a longitudinal direction of said cassette type insulating support.

BRIEF DESCRIPTION OF THE DRAWINGS

FIGS. 1A and 1B are views showing an arrester holder apparatus according to an embodiment of the present invention, in which FIG. 1A is a front view thereof, and FIG. 1B is a sectional view thereof taken along the line A—A in FIG. 1A;

FIGS. 2A and 2B are views showing the original shape of the contact members shown in FIGS. 1A and 1B, in which FIG. 2A is a front view thereof, and FIG. 2B is a sectional view thereof showing a partial section of the contact member;

FIGS. 3A and 3B are views showing the original shape of the ground member shown in FIGS. 1A and 1B, in which FIG. 3A is a front view thereof, and FIG. 3B is a side view thereof; and FIGS. 4A to 4C are perspective views of the arrester holder apparatus according to the embodiment of the present invention, in which FIG. 4C is a perspective view corresponding to the view of FIG. 1A. FIG. 4B is a perspective view corresponding to the view of FIG. 3A, and FIG. 4A is a perspective view when the arresters and the ground member are removed from the construction shown in FIG. 4C.

DETAILED DESCRIPTION OF THE PREFERRED EMBODIMENT

Figure 1B:
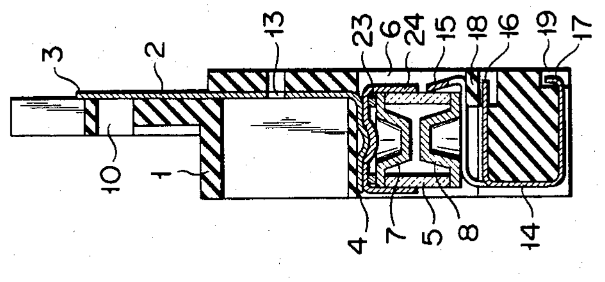

An arrester holder apparatus as shown in the accompanying drawings as an embodiment of the present invention is formed to be a cassette type and is detachably mounted in a distributor of a communication apparatus such as a telephone exchange. The arrester holder apparatus is arranged to protect five subscriber's circuits against a surge voltage/current.

Throughout the accompanying drawings, an assembly is shown wherein contact members 2 each of which comprises a metal plate are partially molded together with a cassette type insulating support 1 made of plastic. More particularly, one contact portion 3 of each of the contact members 2 is exposed at the surface of the insulating support 1. When the insulating support 1 is mounted in the distributor, the contact members 2 are respectively brought into electric contact with the terminals of the circuits to be protected. These terminals are mounted in the distributor. Ten openings 6 are formed in the insulating support 1 so as to detachably mount ten arresters 5 each of which has a pair of electrodes 7 and 8. The openings 6 are offset in the direction corresponding to the width of the insulating support 1. A conductive cap 24 is mounted on each electrode 7 of each arrester 5 through a meltable metal portion 23 which can be melted at a predetermined temperature to be described later. Each of the other contact portions 4 of the contact members 2 is exposed inside the corresponding opening 6 (formed in the insulating support 1) at its one side. Each contact portion 4 is brought into electrical contact with the corresponding electrode 7 of each arrester 5 through the corresponding conductive cap 24. Each arrester 5 is detachably inserted in the corresponding opening 6. In this case, since the openings 6 are offset in the direction corresponding to the width of the insulating support 1, a difference l between the lengths of legs of two adjacent contact portions 4 must be greater than a length L along the axial direction of the corresponding arrester 5, as shown in FIGS. 1A and 2A.

Figure 2B:
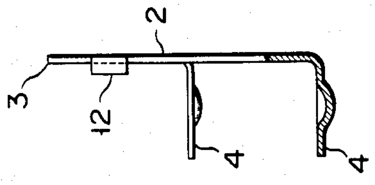
Figure 2A:
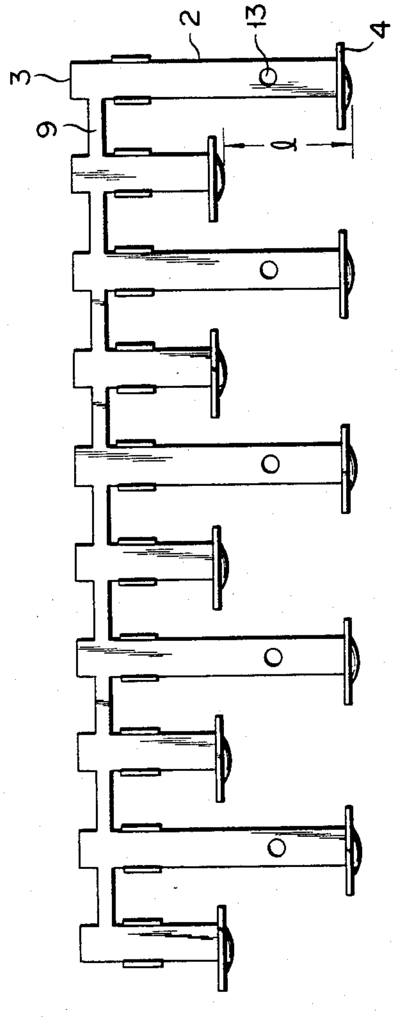

FIG. 2A is a front view showing the original shape of each contact member 2. The legs respectively connected to the contact portions 4 are commonly connected to a transverse connecting band 9. The transverse connecting band 9 is used to allow easy molding of the insulating support 1 and the contact members 2. After molding is completed, connecting portions 11 of the connecting band 9 are cut by punching to form small openings 10. The contact portions 4 are electrically independent of each other. Arcuated portions 12 are respectively formed in legs of the contact portions 4 and are embedded in the insulating support 1 so as to reinforce the mechanical strength between the contact portions 4 and the insulating support 1. If the arcuated portions 12 are not formed, the cut edge portions formed in the manufacture of the legs may stick in the insertion portions of the distributor when the arrester holder apparatus is inserted thereinto or removed therefrom, thereby disabling smooth slidable operation therebetween. However, according to the present invention, as described above, the U-shaped arcuated portions 12 are formed, thus solving the above problem. In particular, when a curved surface is formed on each cut edge portion by the corresponding arcuated portion 12, the slidable operation between the arrester holder apparatus and the distributor can be smoothly performed. Furthermore, holes 13 are respectively formed in the legs of the longer contact portions 4, and the pins of the mold are fitted into the holes 13, respectively, thus properly holding the contact portions 4 in position.

Figure 1A:
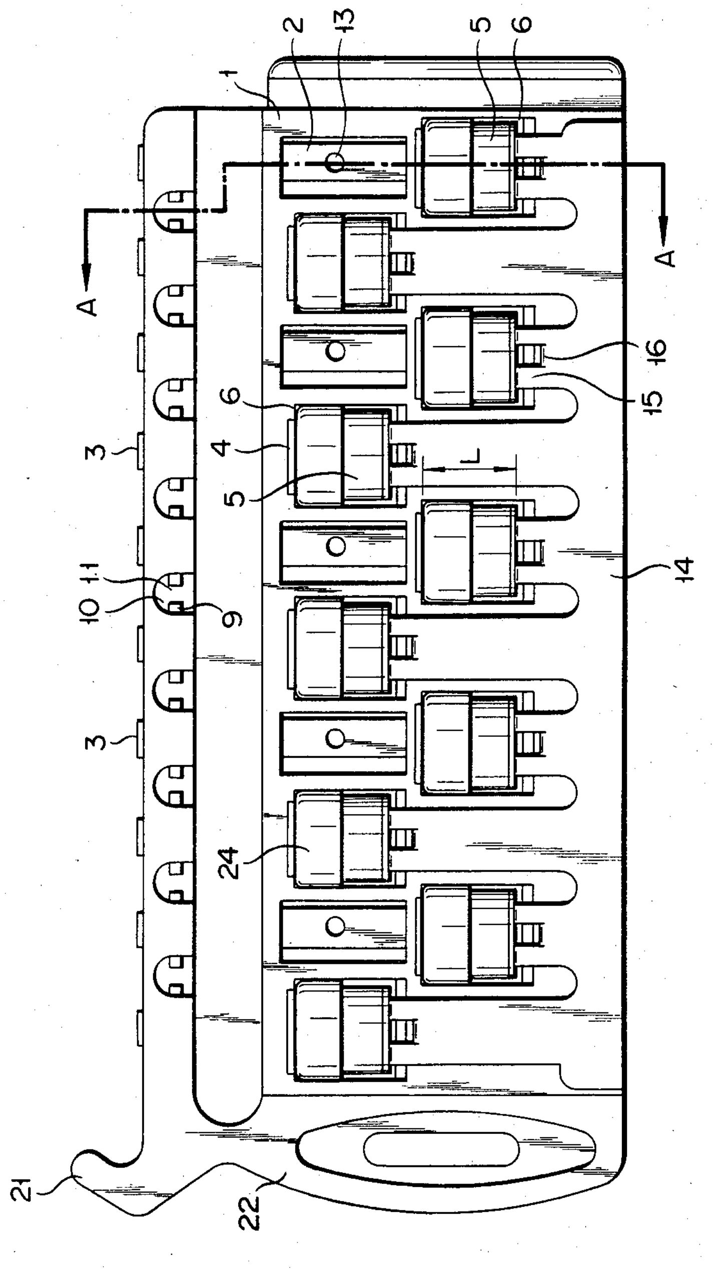

In FIGS. 1A and 1B, a ground member 14 comprising a metal leaf spring is detachably mounted in the insulating support 1. The ground member 14 has contact pieces 15 (one contact portion). Each contact piece 15 is detachably mounted in the corresponding opening 6 of the insulating support 1 so as to oppose the other contact portion 4 of each contact member 2. Each arrester 5 is inserted between the corresponding contact portion 4 and the corresponding contact piece 15, and the other electrode 8 of each arrester 5 is commonly grounded.

Figure 3B:
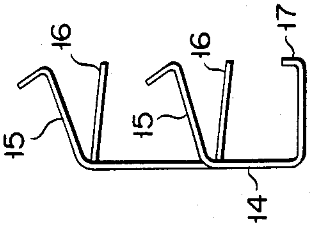
Figure 3A:
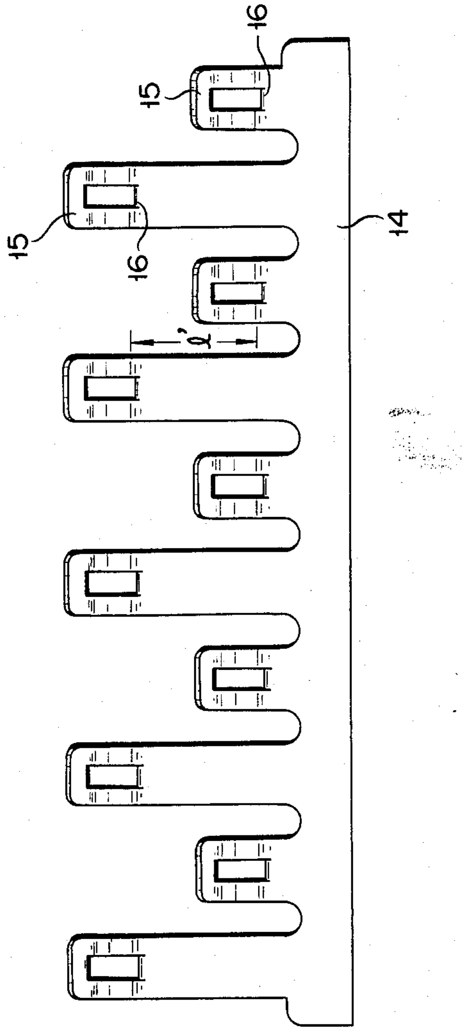

FIG. 3A is a front view showing the original shape of the ground member 14, and FIG. 3B is a side view thereof. Referring to FIGS. 3A and 3B, a difference l' between lengths of the legs of two adjacent contact pieces 15 of the ground member 14 must be greater than the length L along the axial direction of each arrester. The lengths of the legs of two adjacent contact pieces 15 have a symmetrical relation with that of the lengths of the legs of two adjacent contact portions 4. Tongues 16 are respectively formed at central portions of the contact pieces 15 by partial punching. A projection 17 formed at the edge of the ground member 14 is engaged with a notch 19 formed at the lower edge of the back of the insulating support 1. In order to mount the ground member 14 on the insulating support 1, projections 18 formed at the lower edge of the openings 6 are clamped by a spring effect between the contact pieces 15 and the tongues 16, respectively, thereby assuring the engagement between the ground member 15 and the insulating support 1.

The ground member 14 shown in FIGS. 3A and 3B is mounted on the insulating support 1 in a manner as described above, so that the contact portions 4 of the contact members 2 and the contact pieces 15 of the ground member shown in FIGS. 1A and 1B respectively oppose each other in the openings 6 along the direction which is parallel to the plane of the insulating support 1 and perpendicular to the longitudinal direction of the insulating support 1. Each of the arresters 5 is inserted from the front side in FIG. 1A (left side in FIG. 1B) between the corresponding contact portion 4 and the corresponding contact piece 15 which oppose each other in the corresponding opening 6 against the urging force applied by this contact piece 15. Therefore, the corresponding electrode 7 of the arrester 5 is brought into electrical contact with the corresponding contact portion 4 through the corresponding conductive cap 24, while the corresponding electrode 8 is connected to the corresponding contact piece 15. Thus, the arrester holder apparatus shown in FIG. 1A is obtained.

Figure 4A:
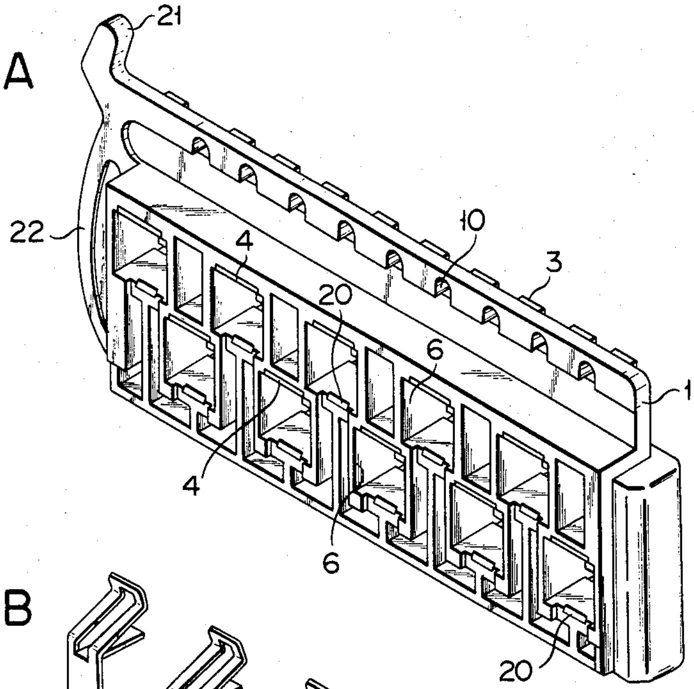
Figure 4B:
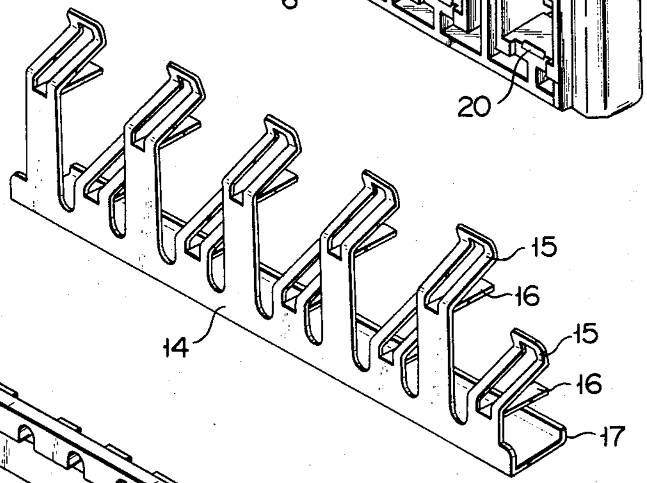
Figure 4C:
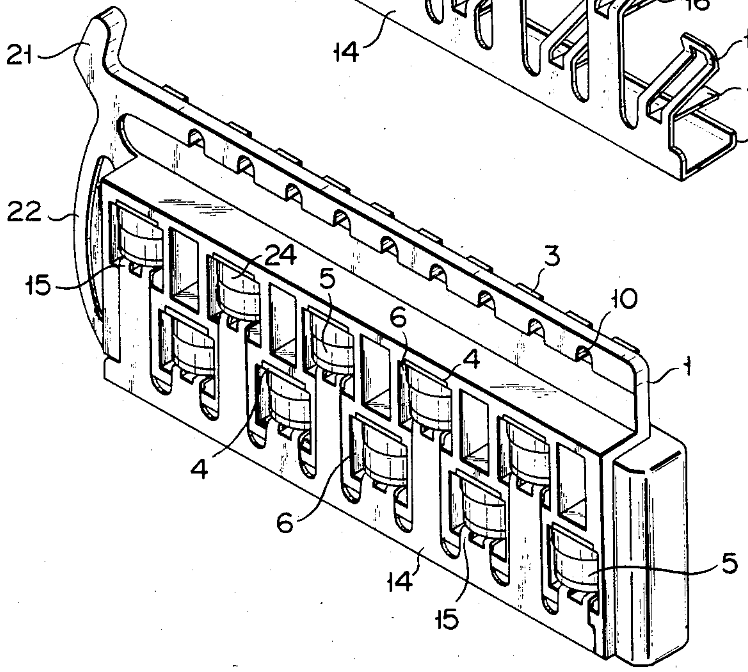

FIGS. 4A, 4B and 4C are perspective views showing the arrester holder apparatus according to the embodiment of the present invention. The same reference numerals as used in FIGS. 1A and 1B denote the same parts in FIGS. 4A, 4B and 4C, and a detailed description thereof will be omitted. Reference numerals 20 denote holes into which tongues 16 are inserted; and 21 and 22, a knob and a handle, respectively, for inserting the arrester holder apparatus into the distributor or removing it therefrom.

The arrester holder apparatus according to the present invention has the construction described above, so that the projection 17 of the ground member 14 can be engaged with the notch 19 formed at the lower edge of the back of the insulating support 1, and the tongues 16 formed on the contact pieces 15 are respectively engaged with the projections 18 through the holes 20. The detachable engagement between the ground member 14 and the insulating support 1 is assured. In this case, once the ground member 14 is mounted on the insulating support 1, the ground member 14 need not be removed therefrom. If needed, it can be removed from the insulating support 1 by pushing the contact pieces 15 through the openings 6 from the rear side in FIG. 1 (right side in FIG. 1B). In the case of inserting the arresters 5 into the respective openings, the arresters 5 can be respectively inserted in the openings while the ground member 14 is mounted on the insulating support 1, thereby providing electrical contact between the contact portions 4 and the contact pieces 15, respectively. When the operator wishes to remove the arresters 5 from the openings 6, respectively, he pushes the arresters 5 through the openings 6 from the rear side in FIG. 1A (right side in FIG. 1B) to respectively remove the arresters 5 from the corresponding openings 6. Therefore, the arrester holder apparatus according to the present invention provides easy mounting and removal of the arresters 5, while the ground member 14 is mounted on the insulating support 1. Therefore, unlike in the conventional apparatus, the ground member need not be removed from the insulating support every time the arresters are removed from or mounted in the openings. Furthermore, the contact pieces of the ground member need not be pressed, thus preventing deformation of the ground member. In addition to the above advantages, the engaged condition between the ground member and the insulating support will not be degraded. A good engagement between the ground member and the insulating support is maintained, so that good electric connections between the arresters and the contact portions 4 and the contact pieces 15 are maintained. Furthermore, the arrester holder apparatus can be smoothly inserted in or removed from the distributor. The adjacent openings 6 are offset along the longitudinal direction of the insulating support 1. As compared with the conventional arrester apparatus in which the openings are linearly aligned along the longitudinal direction of the insulating support 1, a compact arrester holder apparatus is obtained with a high density. Along with this, a compact distributor can be obtained.

In the above embodiment, the conductive cap 24 is mounted on each electrode 7 through the corresponding meltable metal portion 23. When a surge voltage is applied, the corresponding arrester 5 discharges the voltage, and, when this discharging condition continues for a predetermined time interval, the corresponding meltable metal portion 23 is melted by the heat caused by discharging. The conductive cap 24 is then moved downward by the spring force applied between the corresponding contact portion 4 and the corresponding contact piece 15 and then abuts on the contact piece 15, thereby short-circuiting the corresponding pair of electrodes 7 and 8. Therefore, the surge voltage is directly grounded by a short circuit, and the arrester holder apparatus is protected from heat caused by discharging over a long period of time. At the same time, the terminal voltage during discharging can be substantially zero, so that the surge characteristics of the circuit to be protected are improved.

However, the present invention is not limited to the above embodiment. For example, a meltable metal portion 23 and a conductive cap 24 may be provided in each electrode 8. Furthermore, the meltable metal portion 23 and the conductive cap 24 need not be used, in which case each electrode 7 may be directly connected to the corresponding contact portion 4.

What we claim is:

1. An apparatus for holding a plurality of arresters, comprising:

a cassette type insulating support comprising a plate and a plurality of openings formed in said plate, said openings being staggered along a longitudinal axis of said plate;

a plurality of contact members, each of which is partially molded in said cassette type insulating support and each having a first contact portion, a second contact portion, and a leg, said first contact portion being connected to a corresponding terminal of a distributor when said cassette type insulating support is mounted in said distributor, and said second contact portion extending into each of said plurality of openings from one side thereof, a difference between lengths of legs of any two adjacent ones of said plurality of contact members being greater than a length along an axial direction of each of said plurality of arresters;

a ground member having a plurality of contact portions and a common contact portion, each of said plurality of contact portions having a leg and a contact piece inserted at the other side of each of said plurality of openings, and said common contact portion being mounted on said cassette type insulating support so as to be grounded, a difference between the lengths of the legs of any two adjacent ones of said plurality of contact pieces being greater than the length along the axial direction of each of said plurality of arresters; and a plurality of arresters, each comprising a pair of electrodes which are detachably inserted between said second contact portion of each of said contact members exposed inside said one side of each of said plurality of openings, and each of said contact pieces of said ground member inserted in said other side of each of said plurality of openings.

2. An apparatus according to claim 1, wherein U-shaped arcuated portions are respectively formed at said legs of said contact portions of said plurality of contact members, and distal portions of said U-shaped arcuated portions are embedded in said cassette type insulating support when said plurality of contact members are molded together with said cassette type insulating support.

3. An apparatus according to claim 1, wherein said plurality of contact members have substantially L-shaped sections along the longitudinal direction thereof, one end of each of said contact members being exposed on said cassette type insulating support so as to form said one contact portion which is in contact with said corresponding terminal of said distributor, and the other end of each of said contact members being exposed inside a corresponding one of said plurality of openings at one side thereof so as to form the second contact portion which is respectively in contact with one electrode of each of said plurality of arresters.

4. An apparatus according to claim 1, wherein said ground member is made of a metal member which has a spring effect, whereby said arresters are detachably held in said plurality of openings by said plurality of contact pieces of said ground member.

5. An apparatus according to claim 4, wherein a conductive cap is mounted on at least one of said electrodes of each of said arresters through a meltable metal portion which is meltable at a predetermined temperature, and wherein said meltable metal portion is melted when said each of said arresters detachably held in respective ones of said plurality of openings by said contact pieces of said ground member through said conductive cap discharges a surge voltage and when said each of said arresters is thereby operated to heat past a temperature exceeding a predetermined temperature, thereby displacing said conductive cap by said spring effect to short-circuit said electrodes of said each of said arresters.

6. An apparatus according to claim 1, wherein a conductive cap is mounted on at least one of said electrodes of each of said arresters through a meltable metal portion which is meltable at a predetermined temperature, and wherein said meltable metal portion is melted when said each of said arresters detachably held in respective ones of said plurality of openings by said contact pieces of said ground member through said conductive cap discharges a surge voltage and when said each of said arresters is thereby operated to heat past a temperature exceeding a predetermined temperature, thereby displacing said conductive cap by said spring effect to short-circuit said electrodes of said each of said arresters.

7. An apparatus according to claim 1, wherein said second contact portion of each of said contact members extends to said one side of each of said plurality of openings, and wherein each of said contact pieces of said ground member which is inserted in said other side of each of said plurality of openings oppose each other along a direction perpendicular to a longitudinal direction of said cassette type insulating support.

8. An apparatus for holding a number n of arresters comprising:

a cassette type insulating support having n openings provided therethrough, said n openings being arranged on both sides of a medial longitudinal axis of said support, with the longitudinal positions of openings on one side of said axis being staggered with respect to longitudinal positions of openings on the other side of said axis;

n contact members, each being partially encased in said support, and each comprising a first contact portion, a second contact portion, and a leg interconnecting said first and second contact portions, said first contact portion being adapted to interconnect with a corresponding terminal of a distributor, and said second contact portion extending into a first side of a corresponding one of said n openings, the difference between the length of each of said legs and the length of an adjacent leg being greater than an axial length of one of said n arresters; and a ground member comprising a common contact portion, n contact pieces, and n ground legs connecting said n contact pieces to said ground member, said common contact portion being adapted to interconnect with a grounded portion of said distributor, each of said n contact pieces extending into a second side of a corresponding one of said n openings opposite said first side, the difference between the length of each of said n ground legs and the length of an adjacent one of said n ground legs being greater than said axial length of one of said n arresters.

* * * * *